(12) United States Patent
Kang et al.

(10) Patent No.: US 9,947,095 B2
(45) Date of Patent: Apr. 17, 2018

(54) IMAGE PROCESSING APPARATUS FOR PROVIDING IMAGE ANALYSIS AND A METHOD THEREFOR

(71) Applicant: SAMSUNG ELECTRONICS CO., LTD., Suwon-si (KR)

(72) Inventors: Hyo A Kang, Seoul (KR); Joo Hyuk Jeon, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 140 days.

(21) Appl. No.: 14/803,415

(22) Filed: Jul. 20, 2015

(65) Prior Publication Data
US 2016/0027174 A1 Jan. 28, 2016

(30) Foreign Application Priority Data
Jul. 22, 2014 (KR) .................. 10-2014-0092812

(51) Int. Cl.
*G06T 11/00* (2006.01)
*G06T 7/00* (2017.01)

(52) U.S. Cl.
CPC .......... *G06T 7/0016* (2013.01); *G06T 11/001* (2013.01); *G06T 2207/10132* (2013.01); *G06T 2207/20101* (2013.01); *G06T 2207/30096* (2013.01); *G06T 2210/41* (2013.01)

(58) Field of Classification Search
CPC ......... G06T 11/001; G06T 2207/10132; G06T 2207/20101; G06T 2207/30096; G06T 2210/41; G06T 7/0016
See application file for complete search history.

(56) References Cited

U.S. PATENT DOCUMENTS

| | | | |
|---|---|---|---|
| 6,824,514 B2 | 11/2004 | Poland et al. | |
| 8,600,133 B2 | 12/2013 | Buelow et al. | |
| 2011/0255763 A1* | 10/2011 | Bogoni | G06T 19/00 382/131 |
| 2013/0004044 A1* | 1/2013 | Ross | G06T 7/0016 382/131 |
| 2013/0044931 A1* | 2/2013 | Sata | A61B 8/5223 382/131 |

FOREIGN PATENT DOCUMENTS

| | | |
|---|---|---|
| JP | 08-019543 A | 1/1996 |
| JP | 2001-212138 A | 8/2001 |

OTHER PUBLICATIONS

Ukwatta, E., et al. "Three-dimensional semi-automated segmentation of carotid atherosclerosis from three-dimensional ultrasound images." *SPIE Medical Imaging*. International Society for Optics and Photonics, 2012. (7 pages, in English).

* cited by examiner

*Primary Examiner* — Siamak Harandi
(74) *Attorney, Agent, or Firm* — Jefferson IP Law, LLP

(57) ABSTRACT

An image processing techniques and apparatuses providing image analysis that calculates a feature value of an input frame image; compares the feature value of the frame image with a feature value of a previous frame image or standard frame image to determine an area corresponding to a change of the feature value and a degree of the change of the feature value in the input frame image. A color-coded display of the corresponding area may be generated based on the degree of change.

25 Claims, 9 Drawing Sheets
(5 of 9 Drawing Sheet(s) Filed in Color)

IMAGE PROCESSING APPARATUS FOR PROVIDING IMAGE ANALYSIS AND A METHOD THEREFOR

CROSS-REFERENCE TO RELATED APPLICATION(S)

This application claims the benefit under 35 U.S.C. § 119(a) of Korean Patent Application No. 10-2014-0092812, filed on Jul. 22, 2014, in the Korean Intellectual Property Office, the entire disclosure of which is incorporated herein by reference for all purposes.

BACKGROUND

1. Field

The following description relates to medical image processing technology, and more specifically, to a medical image processing apparatus and method.

2. Description of Related Art

The displays of ultrasonic diagnostic equipment currently being used in hospitals only has the capability to display captured images in a simple manner. Using this equipment, a user directly observe the ultrasonic images as they are consecutively output and determines those ultrasonic images used to identify/diagnose diseases. As a result, the user is required to directly process a large amount of data with their eyes. Consequently, a user's skill and degree of fatigue directly affect the diagnosis result.

When diagnosing with the ultrasonic images, the user analyzes a region of interest (ROI) and recognizes the difference between the image of a previous frame and the image of a current frame based solely on the user's memory of the previous frame. Thus, a way to help the user to easily and precisely recognize the differences between frames is required.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, In one general aspect, an image processing apparatus includes: a memory storing an image processing application; a processing device configured to access the memory and implement the image processing application to cause the processing device to: calculate a feature value of an input frame image; compare the feature value of the input frame image with a feature value of a previous frame image to determine an area corresponding to a change in the feature value and a degree of the change in the feature value within the input frame image; and color-code the area based on the degree to generate a color-coded frame image.

The processing device also may calculate a feature value of a previous frame image.

The previous frame image may be a standard frame image.

The feature may be at least one of a presence of a tumor, an absence of a tumor, a location of the tumor, a distribution of intensity within the image, a tissue distribution, an abnormal tissue area, a texture, and a difference from a normal tissue distribution.

The image processing apparatus also may include a color display configured to display the color-coded frame image.

The processing device may set a region of interest (ROI) of the input frame image by tracking the ROI of the previous frame image. The processing device also may calculate the feature value of the input frame image using: a first feature value calculation technique on the set ROI, and a second feature value calculation technique on a remainder of the frame image. The first feature value calculation technique may comprise a relatively complex calculation as compared to the second feature value calculation technique, and the second feature value calculation technique may comprise a relatively simple calculation as compared to the first feature value calculation technique. The ROI of the input frame image may be indicated by at least one of a specific mark, a specific line, and a specific color.

The processing device may color-code an area corresponding to a change of the feature value having a degree that is greater than a preset threshold.

The processing device may color-code the area by adjusting a color, a color saturation, or a transparency based on a distance between the frame image and the previous frame image to visually distinguish the color-coded area.

The processing device may store the color-coded frame image when the degree is greater than a preset threshold.

The processing device may set an area of the input frame image where the degree is greater than a preset threshold as the ROI.

In another general aspect, a computer implemented image processing method includes: calculating, by a processing device, a feature value of a frame image; comparing, by the processing device, the feature value of the frame image with a feature value of a previous frame image to determine an area of a changed feature value and a degree of the changed feature value in the frame image; color-coding, by the processing device, the area based on the degree; and generating a color-coded frame image for display.

The previous frame image may be a standard frame image.

The image processing method, prior to the calculating the feature value of the frame image may set a region of interest (ROI) of the frame image by tracking the ROI of the previous frame image.

The calculating of the feature value of the input frame image may comprise calculating the feature value of the input frame image using a first feature value calculation technique on the set ROI and a second feature value calculation technique on a remainder of the frame image. The first feature value calculation technique may comprise a relatively complex calculation as compared to the second feature value calculation technique, and the second feature value calculation technique may comprise a relatively simple calculation as compared to the first feature value calculation technique. The generating the color-coded frame image may comprise generating an indication of the ROI of the frame image using at least one of a specific mark, a specific line, and a specific color.

The color-coding of the area may comprise color-coding an area corresponding to a change of the feature value having a degree that is greater than a preset threshold.

The color-coding of the area may comprise color-coding the area by adjusting a color, a color saturation, or a transparency based on a distance between the frame image and the previous frame image to visually distinguish the color-coded area.

The image processing method also may include: storing the color coded frame image when the degree is greater than a preset threshold.

The image processing method also may include: setting an area of the input frame image where the degree is greater than a preset threshold as the ROI.

Other features and aspects will be apparent from the following detailed description, the drawings, and the claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be appreciated by one of ordinary skill in the art, with the exception of operations necessarily occurring in a certain order. Also, descriptions of functions and constructions that are well known to one of ordinary skill in the art may be omitted for increased conciseness and clarity.

The features described herein may be embodied in different forms, and are not to be construed as being limited to the examples described herein. Rather, the examples described herein have been provided so that this disclosure is thorough, complete, and conveys the full scope of the disclosure to one of ordinary skill in the art.

Figure 1:
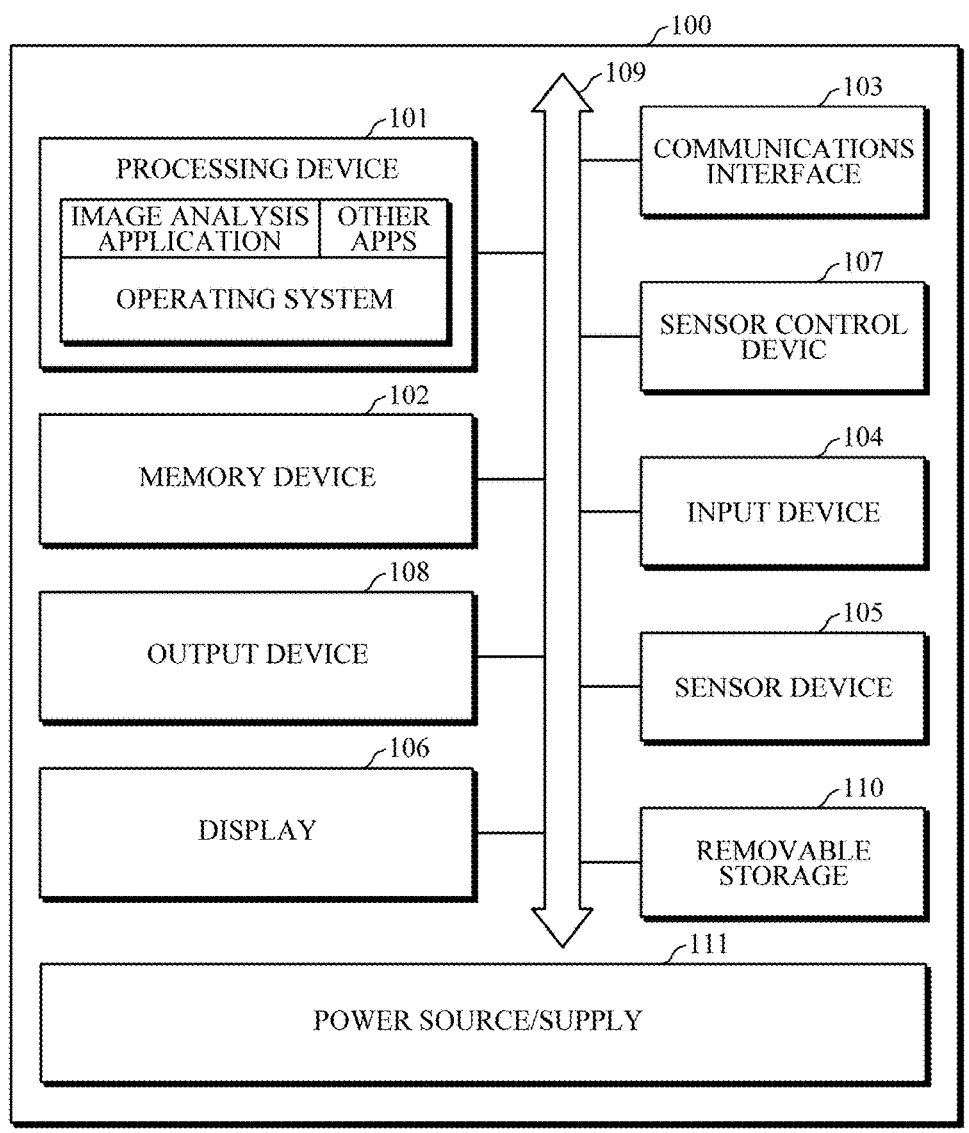
FIG. 1 is a block diagram illustrating an image processing apparatus according to an exemplary embodiment.

FIG. 1 is a block diagram of an example of a medical imaging processing apparatus 100. In one example, the imaging processing apparatus 100 may be an ultrasonic diagnostic apparatus, or any other device that includes a processing device implementing the imaging processing described herein.

FIG. 1 shows one example of an imaging processing apparatus 100 for ultrasonic image diagnosis; however, it will be appreciated that this device is only exemplary and that any number of, types of, or configurations of different components and software may be incorporated into or omitted from the device according to the intended application or use in any particular user environment. In addition, although this example is described with ultrasonic diagnostic equipment, it is not limited thereto.

As shown in FIG. 1, the imaging processing apparatus 100 includes any number of components including one or more processing devices 101 and one or more non-transitory storage devices 102. The imaging processing apparatus also may include additional components including one or more of the following: a communications interface 103 to send and/or receive signals in one or more communication formats allowing the apparatus to communicate or exchanged data with other devices (e.g., hospital, medical, or other diagnostic equipment), an input device 104, (e.g., a touch screen, a keyboard, a key pad, a mouse, a pointer device, a trackball, a joystick), an sensor device 105 (e.g., transducer probe), a display 106 (e.g., a color display device, such as a touch screen display, a color Liquid Crystal Display (LCD), a Light Emitting Diode (LED) display), a sensor control device (e.g., transducer pulse controls that change the amplitude, frequency and duration of the pulses emitted from the transducer probe) 107, and output device 108 (e.g., a speaker), a communications bus 109 allowing various components of the user device to access and/or exchange data, a removable storage device 110, and a power source or supply 111 to receive and/or provide power to the various components of the user device. The imaging processing apparatus 100 also may include one or more associated peripheral devices (not shown), such as, for example, a display, a memory, a printer, an input device, an output device, and speakers. As is appreciated by those skilled in the art, any of these components (other than at least one processing device) may be included or omitted to create different configurations or types of user devices, for example, to perform specific or specialized needs or tasks, generalized needs or multiuse tasks, or for various performance criteria, such as, mobility, speed, cost, efficiency, power consumption, ease of use, among others.

A processing device 101 may be implemented using one or more general-purpose or special purpose computer, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS including an image processing application including anchor point setting function, an image analyzing function, a feature value comparing function, and a display coding function in addition to other applications (e.g., controllers, drivers, communication applications, etc.). It will be appreciated by one of ordinary skill in the art within the context of an image processing application, any or each of the above-mentioned functions may be implemented as a separate application. The processing device also may access, store, manipulate, process, and create data in response to execution of the applications, such as, for example, ultrasonic image or frame data. For purpose of simplicity, the description of a processing device is used as singular; however, one skilled in the art will appreciated that a processing device may include multiple processing elements or devices and multiple types of processing elements or devices. For example, a processing device may include multiple processors or a processor, registers or buffers, a memory, and a controller. In addition, different processing configurations are possible, such as serial processors, parallel processors, a quad processor, a main processor and a display processor or caching processor, among others.

As used herein, a processing device configured to implement a function A includes a processor programmed to run specific software. In addition, a processing device configured to implement a function A, a function B, and a function C may include configurations, such as, for example, a processor configured to implement both functions A, B, and C, a first processor configured to implement function A, and a second processor configured to implement functions B and C, a first processor to implement function A, a second processor configured to implement function B, and a third processor configured to implement function C, a first processor configured to implement function A, and a second processor configured to implement functions B and C, a first processor configured to implement functions A, B, C, and a second processor configured to implement functions A, B, and C, and so on.

The software or applications implemented by the processing device 101 may include a computer program, a piece of code, an instruction, or some combination thereof, for independently or collectively instructing or configuring the processing device to operate or perform functions as desired. Examples of software applications include: an operating system, drivers to control and/or operate various components of the user device (e.g., display, communications interface, input/output devices, etc.). The applications may be resident in the processing device, loaded from a storage device, or accessed from a remote location or a storage device (e.g., using a communications interface 103). Once the applications are loaded in or executed by the processing device, the processing device becomes a specific machine or apparatus configured to perform functions, such as to provide image analyzing, among others. That is to say an image analyzing apparatus 100 with a processing device 101 programmed in a certain way is physically different machine than that of an apparatus without such programming as its memory elements are differently arranged and/or configured.

The software, applications, content, and data may be embodied permanently or temporarily in any type of machine, component, physical or virtual equipment, computer storage medium or device, or in a propagated signal wave capable of providing instructions or data to or being interpreted by the processing device. In particular, the software, applications, content, or data may be stored by one or more non-transitory computer storage devices or mediums 102, 110 including volatile and non-volatile memories that store digital data (e.g., a read only memory (ROM), a random access memory (RAM), a flash memory, a floppy disk, a hard disk, a compact disk, a tape, a DROM, a flip-flop, a register, a buffer, an SRAM, DRAM, PROM, EPROM, OPTROM, EEPROM, NOVRAM, or RAMBUS), such that if the storage device is read or accessed by the processing device, the specified steps, processes, and/or instructions are performed and/or data is accessed, processed, and/or stored. The computer storage device may include an I/O interface, such that data and applications may be loaded and stored in or accessed or read from the computer storage device allowing the applications, programming, and data to be used, updated, deleted, changed, augmented, or otherwise manipulated. The computer storage device 110 may be removable, such as, for example, a disk drive, a card, a stick, or a disk that is inserted in or removed from the user device.

Functional programs, codes, code segments, and software for implementing the examples disclosed herein can be constructed by a programmer skilled in the art to which the examples pertain once guided by the drawings and their corresponding descriptions as provided herein.

Software or instructions for controlling a processing device to implement a software component may include a computer program, a piece of code, an instruction, or some combination thereof, for independently or collectively instructing or configuring the processing device to perform one or more desired operations. The software or instructions may include machine code that may be directly executed by the processing device, such as machine code produced by a compiler, and/or higher-level code that may be executed by the processing device using an interpreter. The software or instructions and any associated data, data files, and data structures may be embodied permanently or temporarily in any type of machine, component, physical or virtual equipment, computer storage medium or device, or a propagated signal wave capable of providing instructions or data to or being interpreted by the processing device. The software or instructions and any associated data, data files, and data structures also may be distributed over network-coupled computer systems so that the software or instructions and any associated data, data files, and data structures are stored and executed in a distributed fashion.

The storage devices 102 and 110 also may store frame images, standard frame images, and coded or processed from images.

Figure 2A:
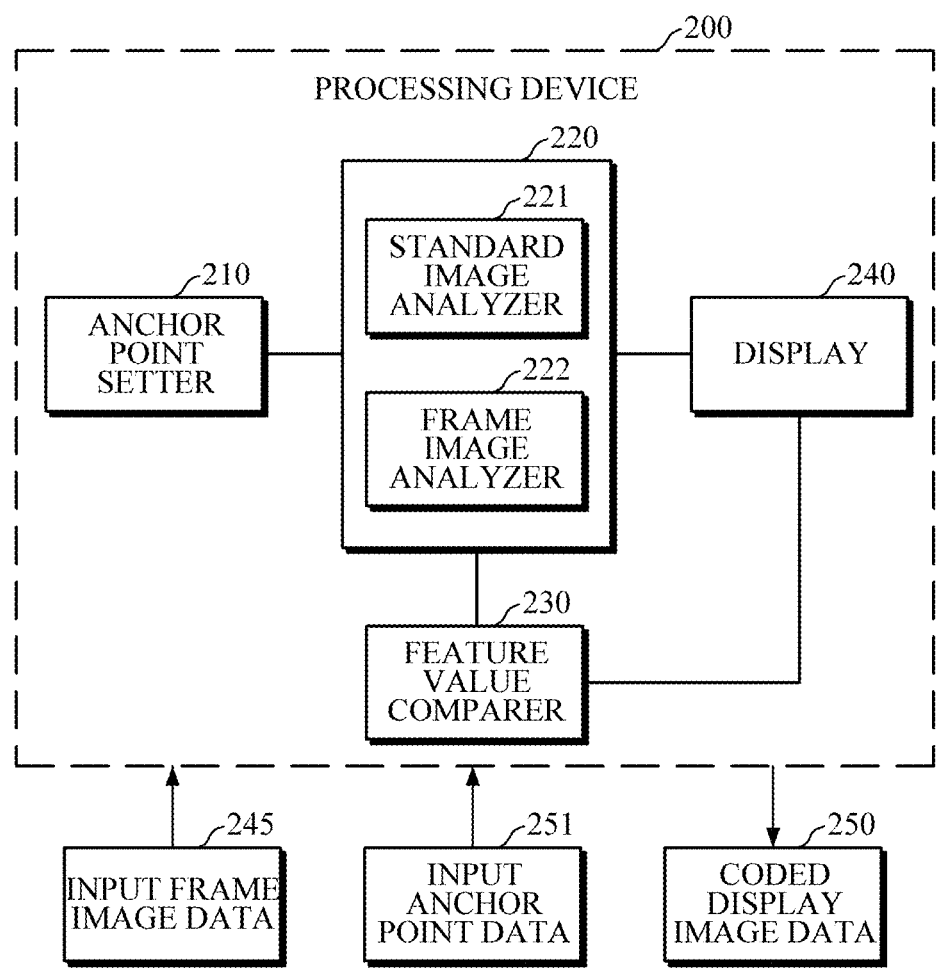
FIGS. 2A and 2B are block flow diagrams illustrating an image processing apparatus according to another exemplary embodiment.

FIG. 2A is a block diagram illustrating an example of a medical imaging processing apparatus 200.

Referring to FIG. 2A, an image processing device 200, according to an exemplary embodiment, may include a processing device 101 programmed to implement an anchor point setting function 210, an image analyzing application 220, a feature value comparing function 230, and a display function 240. The image analyzing application 220 may implement a standard image analyzing function 221, and a frame image analyzing function 222. The image processing device 200 receives image input data 245 (e.g., a standard image frame, a real time image frame, a previous image frame, and/or an input image frame), processes the image data, and outputs processed/coded image data 250 for display or storage (e.g., a color coded or visually altered image frame).

The anchor point setting function 210 sets an anchor point on a standard image corresponding to the standard image input data according to the user's input or as result of the image analysis by the image analyzing application 220.

For example, the anchor point setting function 210 may set a point that the user selects within a standard image as the anchor point based on data 251 input to the processing device 101 (e.g., from an input device 104).

Here, the anchor point indicates a point, a position, or coordinates within the image where an image analysis is started by using a first feature value calculation technique described later. As the user sets the anchor point, a start point of the image analysis that uses the first feature value calculation technique may be arbitrarily set.

Analysis of the standard image may be started using the first feature value calculation technique.

In another example, the anchor point setting function 210 may set, as the anchor point, a center of a lesion area that has been extracted from the standard image analyzed by the image analyzing application 220.

The image analyzing application 220 analyzes a standard image and a frame image. To this end, the image analyzing application 220 may include a standard image analyzing function 221 and a frame image analyzing function 222.

The standard image analyzing function 221 sets a region of interest (ROI) on the standard image. For example, the standard image analyzing function 221 may detect the lesion from the standard image by using an automatic lesion detection algorithm, such as, for example, Adaptive Boosting (AdaBoost), Deformable Part Models (DPM), Deep Neural Network (DNN), and Sparse Coding, among others. The standard image analyzing function 221 also sets an area including the detected lesion as the ROI.

In another example, in a case where the anchor point setting function 210 sets the anchor point on the standard image according to the user's input, the standard image analyzing function 221 sets the ROI based on the anchor point set on the standard image. That is, the standard image analyzing function 221 sets an area within a predetermined radius or range based on the set anchor point input by the user as the ROI.

The standard image analyzing function 221 calculates a feature value of the standard image using the first feature value calculation technique. Here, the feature may include the presence or the absence of a tumor, a location of the tumor, a distribution of intensity within the image, a tissue distribution, an abnormal tissue area, a texture, and a difference from a normal person's tissue distribution, etc.

The first feature value calculation technique may include relatively complex calculation as compared to a second feature value calculation technique described later. For example, the first feature value calculation technique may include image segmentation, in addition to data mining, rule mining, and a regression analysis, which, as input, use a value extracted from the input image data through Fast Fourier Transform (FFT), Histogram of Oriented Gradient (HOG), a raw value, and deep learning, etc. However, the first feature value calculation technique is not limited thereto, and may include various techniques of calculating a feature value using a relatively complex calculation as compared to the second feature value calculation technique described later.

The frame image analyzing function 222 tracks the ROI that is set in the standard image, or in the previous frame image, using an object tracking algorithm. The frame image analyzing function 222 sets the ROI of the frame image with regard to real-time frame images that are input after the analysis of the standard image is complete.

The frame image analyzing function 222 calculates the feature value of an input frame image using the first feature value calculation technique and the second feature value calculation technique. Here, the second feature value calculation technique may include a relatively simple calculation as compared to the first feature value calculation technique. For example, the second feature value calculation technique may include Fast Fourier Transform (FFT), Histogram of Oriented Gradient (HOG), a difference of intensity, and the like. However, the second feature value calculation technique is not limited thereto, and may include various techniques of calculating the feature value through a relatively simple calculation as compared to the first feature value calculation technique.

In one exemplary embodiment, the frame image analyzing function 222 uses the first feature value calculation technique on the ROI of the input frame image and the second feature value calculation technique on the remainder of the input frame image to calculate the feature value of the input frame image.

The feature value comparing function 230 may compare the feature value of the input frame image with the feature value of the standard image. Also, the feature value comparing function 230 may compare the feature value of the frame image with the feature value of the previous frame image. That is, a comparison subject of the frame image may be the standard image or the previous frame image (e.g., n−1th frame image, n−2th frame image, and n−3th frame image in a case where the frame image is n-th frame image).

The feature value comparing function 230 may extract, from the input frame image, an area of the changed feature value based on the comparison result and determine the degree of change of the feature value for the area.

In an exemplary embodiment, when extracting the area corresponding to a changed feature value, the feature value comparing function 230 may extract only an area where the degree change of the feature value is greater than a preset threshold.

In an exemplary embodiment, when extracting the area of the changed feature value, the feature value comparing function 230 may separate the degree of change of the feature value into various levels and extract the area corresponding to the changed feature value for each level.

The display function 240 color-codes the extracted area corresponding to the changed feature value based on the degree of change of the feature value. The color coding is applied to the corresponding frame image for display as a color-coded frame image.

For example, when color-coding the frame image, the display function 240 may code the extracted area to display a different color, color saturation, or transparency, etc., depending on the degree of change of the feature value corresponding to the area, with respect to each area having a changed feature value.

In another example, when color-coding the frame image, the display function 240 adjusts a color, a color saturation, or a transparency, etc., of the area of the frame depending on a frame distance between the frame image and the previous frame, and displays the area corresponding to the changed feature value with the adjusted color, color saturation, or transparency.

When encoding the color-coded frame image, the display function 240 may encode display date corresponding to an ROI by using a specific mark, a specific line, a specific color, and the like, to distinguish the ROI set in the frame image from another area.

A detailed description related to various examples of the display processing is described below with reference to FIGS. 3A, 3B, and 3C.

In an exemplary embodiment, when the analysis of the standard image is complete, the image processing apparatus 100 notifies a user that the analysis of the standard image has been completed (e.g., using sounds, images, vibration, etc.)

Figure 2B:
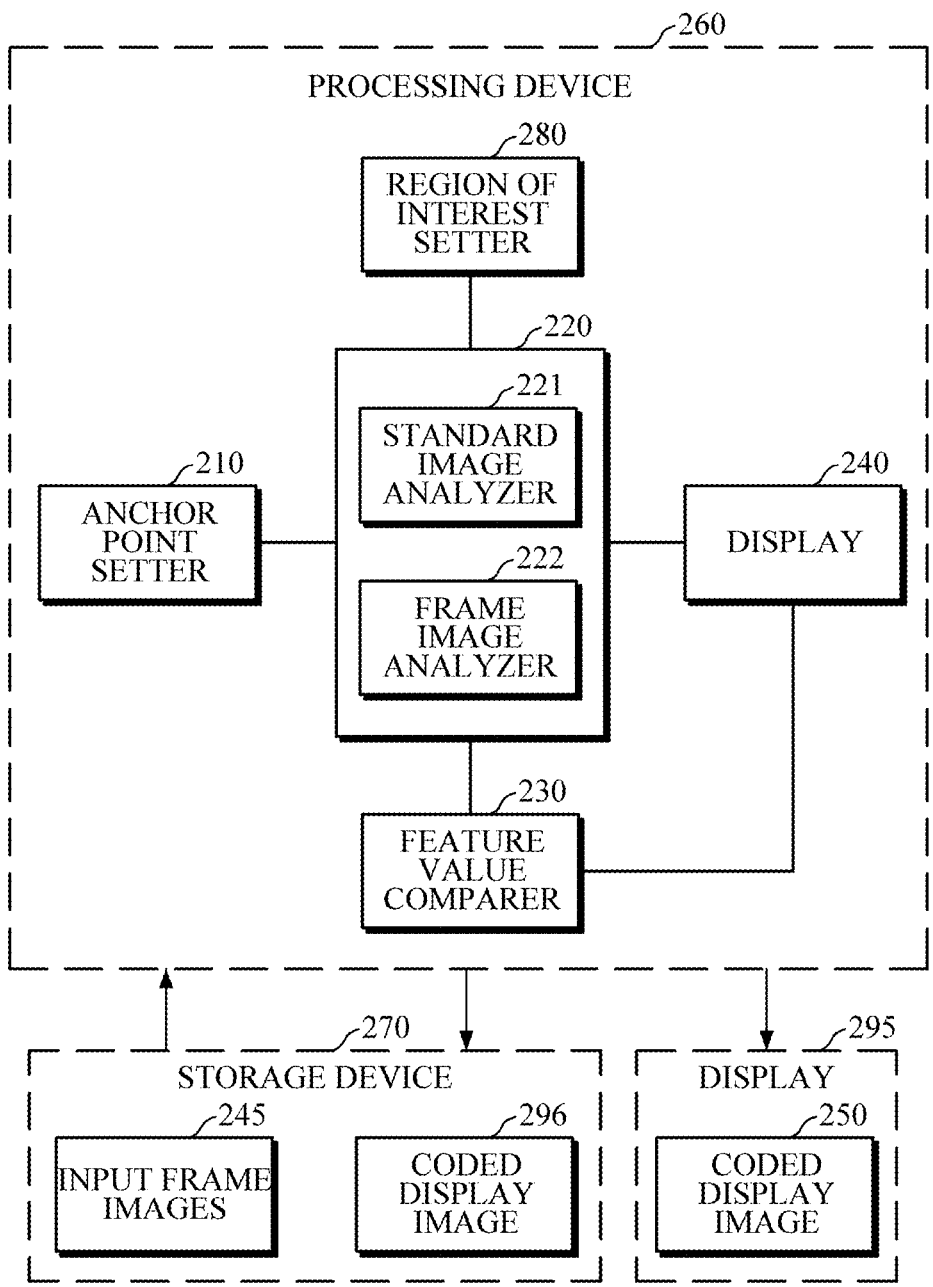

FIG. 2B is a block diagram illustrating an example of a medical image processing apparatus 260 according to another exemplary embodiment.

Referring to FIG. 2B, an image processing apparatus 260 additionally includes a storage device 270, an ROI setting function 280, and display 295 in addition to an image processing device 101 illustrated in FIG. 2A.

The storage device 270 stores one or more frame images. The storage device also may store a color-coded frame image 296, for example, when the comparing function determines a degree of change of a feature value is greater than a preset threshold.

The storage device 270 may be implemented using the storage device described above for elements 102 or 110, such as a flash memory type, a hard disk type, a multimedia card micro type, a card-typed memory (e.g. SD or XD memory), Random Access Memory (RAM), Static Random Access Memory (SRAM), Read Only Memory (ROM), Electrically Erasable Programmable Read Only Memory (EEPROM), Programmable Read Only Memory (PROM), magnetic memory, a magnetic disk, an optical disc, and the like.

The ROI setting function 280 sets an area as a ROI where the degree of the change of the feature value is greater than a preset threshold. For example, the ROI setting function 280 may additionally set an area as a ROI of the frame image where the degree of change of the feature value is greater than the preset threshold for the corresponding area, excepting the ROI of the frame image set by an image analyzing application 220.

The display device 295 displays the processed frame image output from the processing device (or an intermediary graphics processing device (not shown)) that is coded visually distinguish an area according to the degree of change of the feature value. The display may include on or more display devices 104.

Figure 3A:
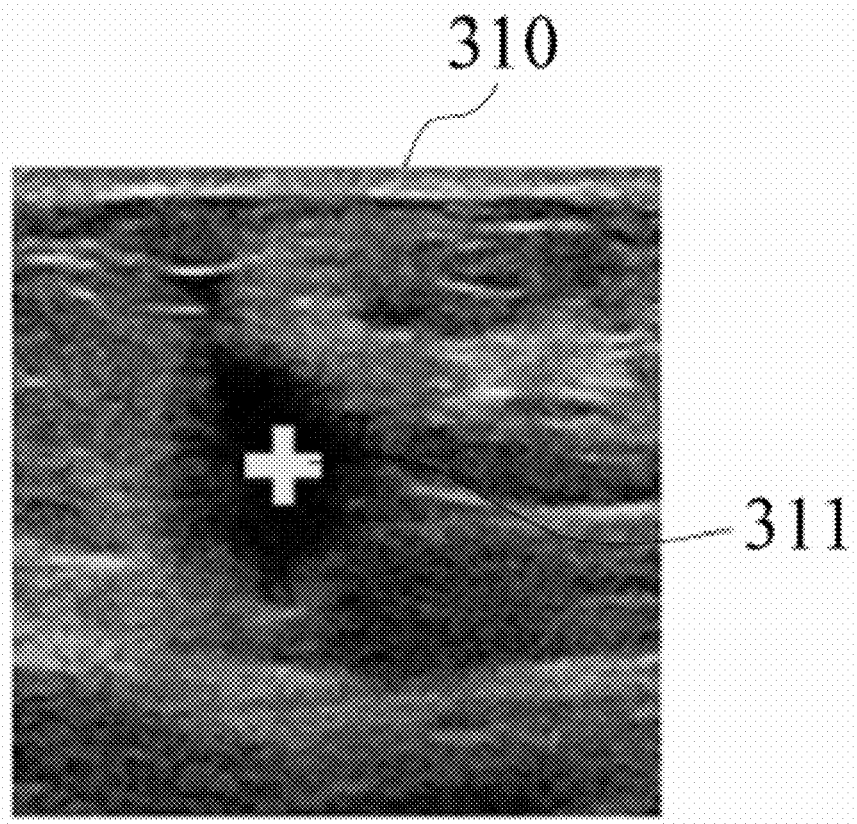
FIGS. 3A to 3C are examples of images illustrating examples of a method for color-coding a frame image.
Figure 3B:
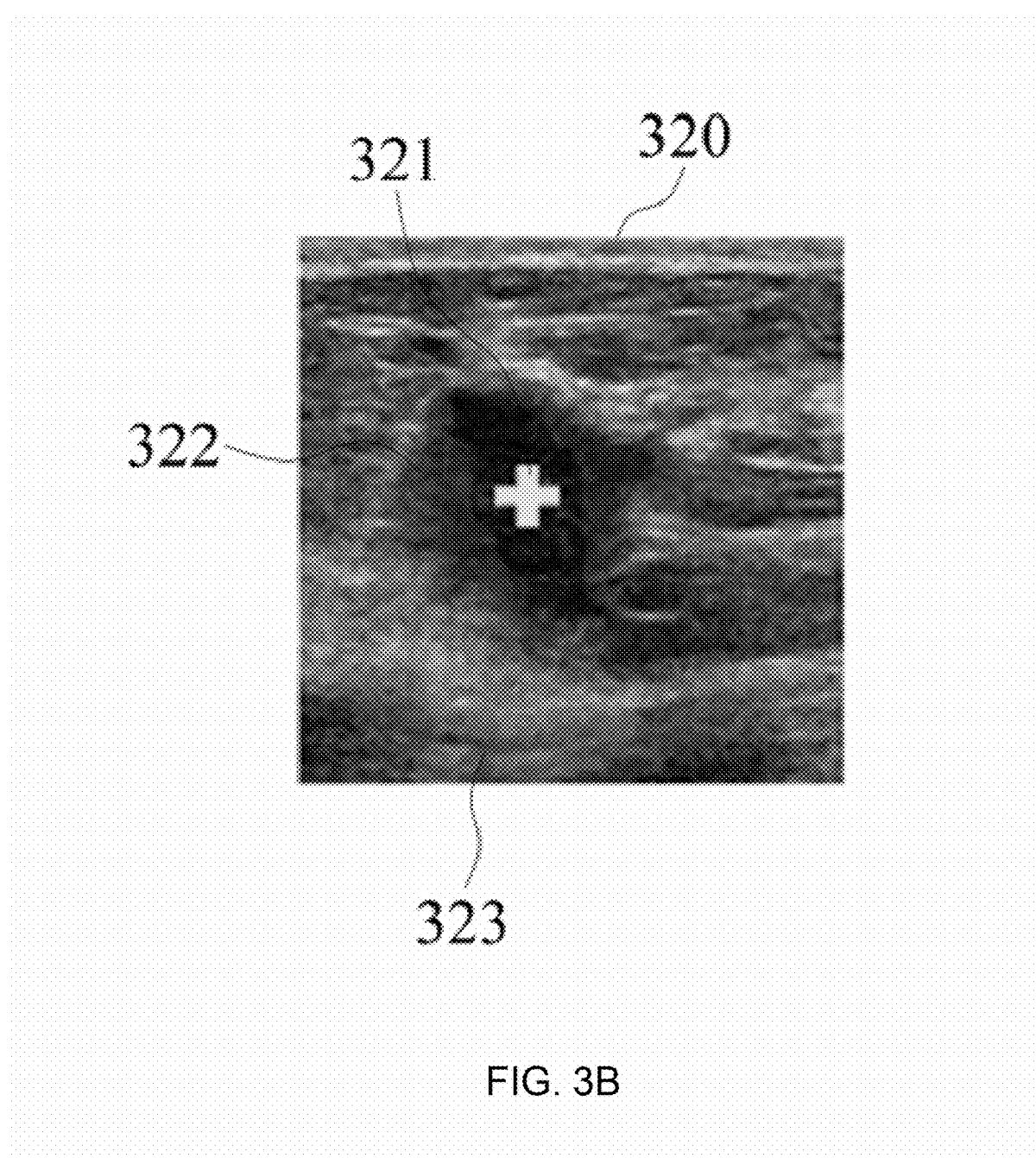
Figure 3C:
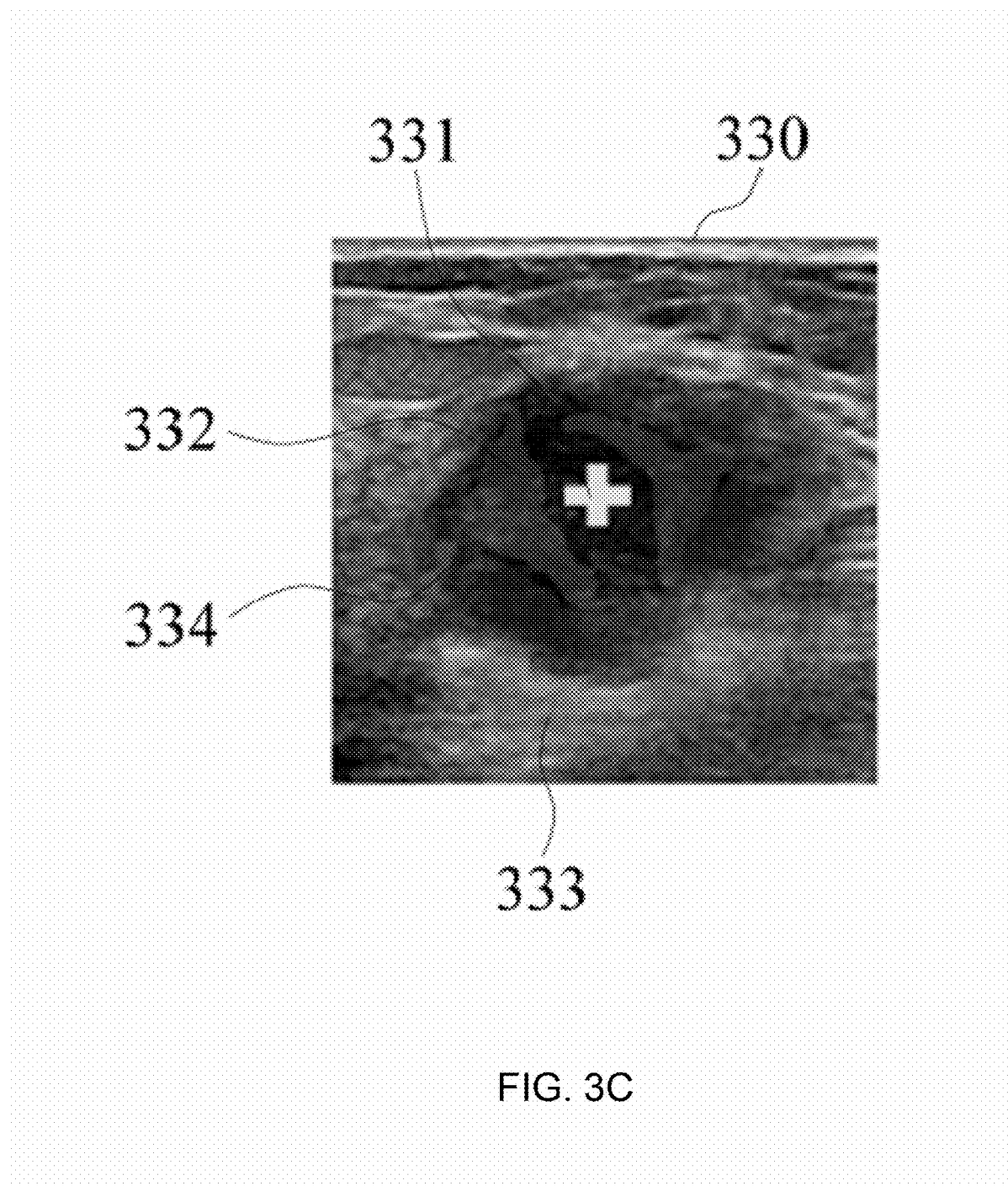

FIGS. 3A to 3C are images illustrating examples of a method for color-coding a frame image by an imaging processing apparatus. Specifically, FIG. 3A is a diagram illustrating an example of a standard image; FIG. 3B is a diagram illustrating an example of a color-coded first frame image; and FIG. 3C is a diagram illustrating an example of a color-coded second frame image.

In the following description of FIGS. 3A, 3B, and 3C, it is assumed that intensity is used as the representative feature value used by the imaging processing apparatus generating the images.

Referring to FIG. 3A, image processing apparatuses 200 and 260 in FIGS. 2A and 2B, respectively, analyze a standard image 310 to detect a lesion and set an area as an ROI that includes the detected lesion. In the example shown FIG. 3A, a cross mark 311 is depicted at the center of the ROI. However, the cross mark 311 is only one example of a depiction, and the exemplary embodiments described herein are not limited thereto. Thus, one skilled in the art will appreciate the ROI and an indication of its center are capable of being depicted in various manners.

In addition, as described above, the image processing apparatuses 200 and 260 may set an ROI around an anchor point set by the user.

Referring to FIG. 3B, the image processing apparatuses 200 and 260 track the ROI of the standard image 310 and set the ROI of a first frame image 320. Here, a cross mark 321 is shown at the center of the ROI of the first frame image 320.

The image processing apparatuses 200 and 260 compare the intensity of the standard image 310 and the intensity of the first frame image 320, determine a degree change of the intensity between the standard image 310 and the first frame image 320, determine an area corresponding to the changed intensity, and display colors according to the degree of changed intensity indicating areas corresponding to the changed intensities. In an example of FIG. 3B, a red area 322 indicates an area where the intensity in the first frame 320 is reduced meaningfully as compared to the standard image 310, and a blue area 323 indicates an area where the intensity in the first frame 320 increases meaningfully compared to the standard image 310.

Referring to FIG. 3C, the image processing apparatuses 200 and 260 track the ROI of the standard image 310, or the first frame image 320, and set the ROI of a second frame image 330. Here, a cross mark 331 is shown at the center of the ROI of the second frame image 330.

The image processing apparatuses 200 and 260 compare the intensity of the first image 320 and the intensity of the second frame image 330, determine a degree of change of the intensity, determine an area corresponding to changed intensity, and display colors according to the degree of changed intensity associated with the areas of changed intensity. In addition, the image processing apparatuses 200 and 260 compare intensity of the standard image 310 and intensity of the second frame image 330, determine the degree of change of the intensity, determine the areas associated with the changed intensity, and display colors according to the degree of changed intensity of the area of changed intensity. Here, the comparison result of the first frame image 320 and the second frame image 330, and the comparison result of the standard image 310 and the second frame image 330 are shown in a manner that distinguishes one from the other.

For example, the comparison result of the second frame image 330 with the first frame image 320 (i.e., the immediate prior image) is indicated by a deep red area 334 as an area where the intensity is reduced meaningfully; and the comparison result of the second frame image 330 with the standard image 310 is indicated by a light red area 332 as an area where the intensity is reduced meaningfully. In addition, a blue area 333 is an area where the intensity increases meaningfully where the second frame image 330 is compared with the first frame image 320 (i.e., the immediately prior image).

As illustrated in FIG. 3C, a user may infer the ROI or a shape of a tumor through color-coding for a frame interval.

Figure 4A:
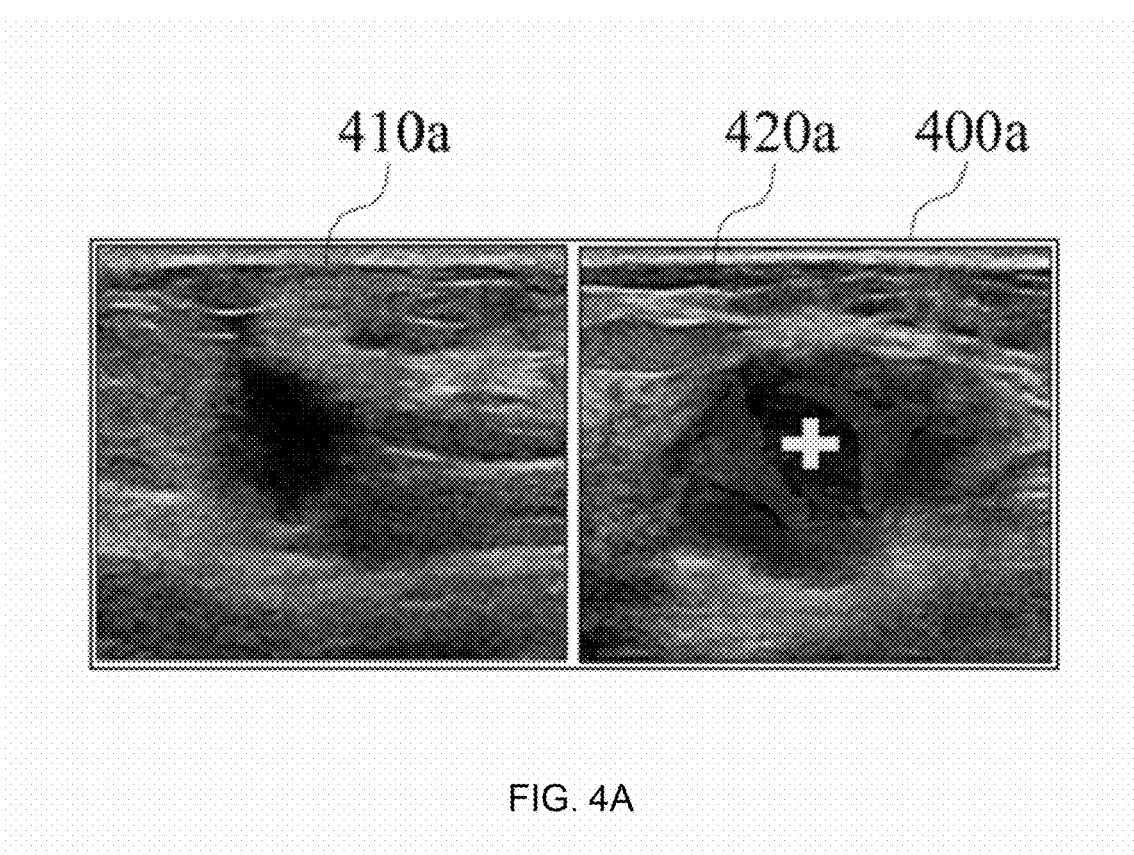
FIGS. 4A and 4B are examples of images illustrating examples of a display that shows a color-coded frame image.
Figure 4B:
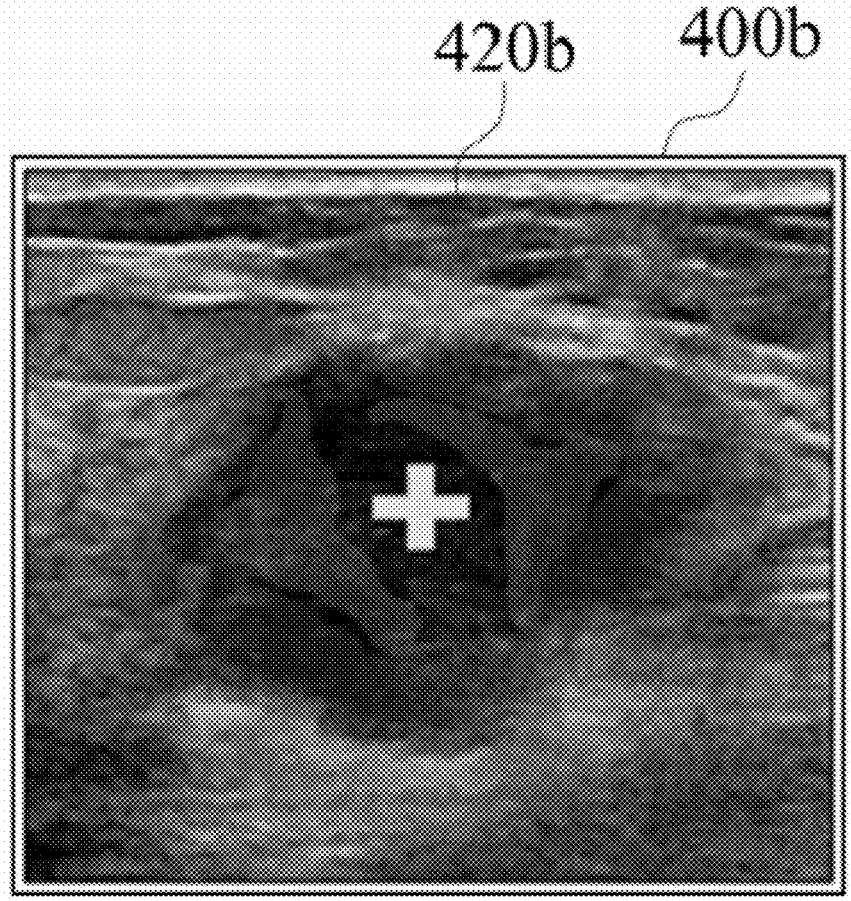

FIGS. 4A and 4B are images illustrating examples of a display that shows a color-coded frame image generated by an imaging processing apparatus. Specifically, FIG. 4A is are images illustrating an example of a display that shows a color-coded frame image alongside of an original frame image; and FIG. 4B is an image illustrating an example of a display that shows the color-coded frame image without the original frame image.

Referring to FIG. 4A, when a color-coded frame image is displayed, one display may be separated into two areas, one of which shows a current frame image 410a that corresponds to a real-time image and the other of which shows a color-coded frame image 420a.

In addition, although FIG. 4A illustrates an example of two images 410a and 420a of the same size, one skilled in the art will appreciate that the images also may be displayed in sizes that are different from each other.

FIG. 4B shows an alternative display format in which a color-coded frame image 420b is displayed by the image processing apparatuses 200 and 260 without display of the current frame image 410a.

Figure 5:
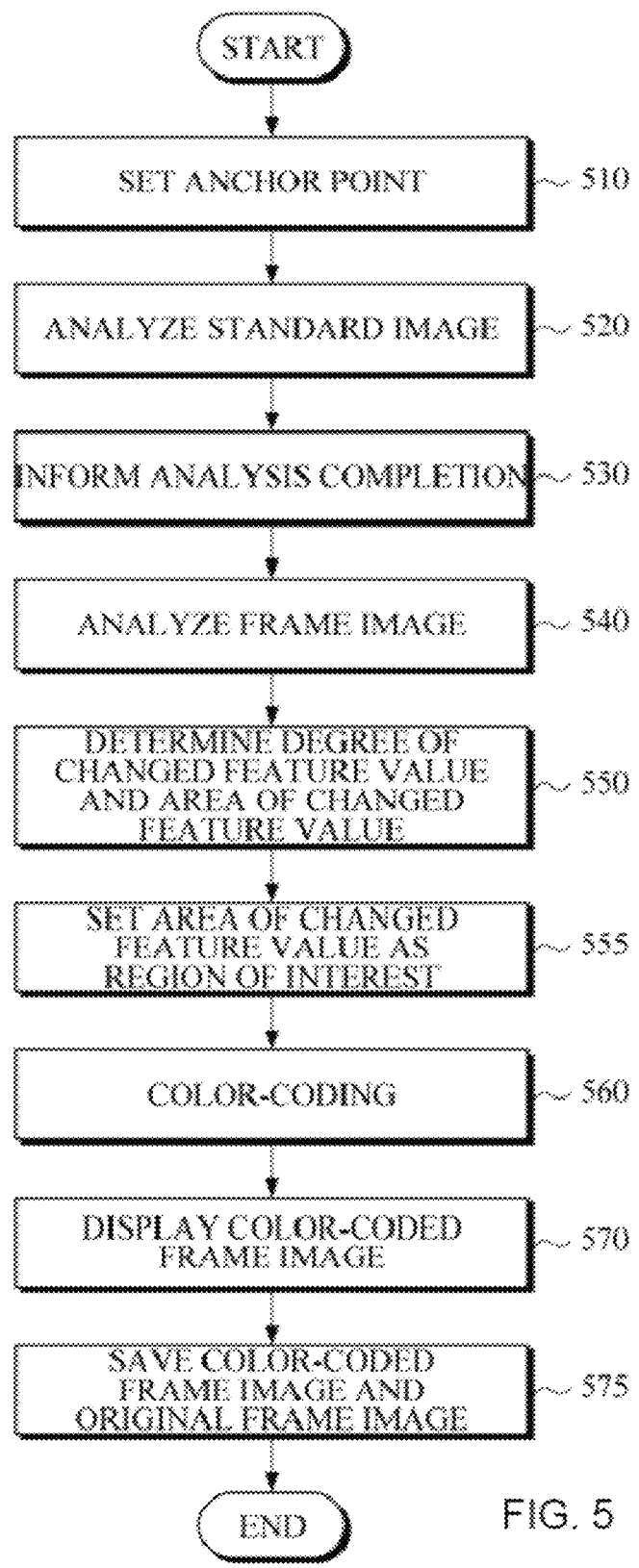
FIG. 5 is a flowchart illustrating an image processing method according to an exemplary embodiment.

FIG. 5 is a flowchart illustrating an image processing method according to an exemplary embodiment.

Referring to FIG. 5, in operation 510 an anchor point on a standard image is set according to an input by the user. For example, the user may enter coordinates or position an indicator on a display screen of the image analyzing apparatus using an input device 104.

In operation 520, the standard image is analyzed by the processing device 101. For example, the image processing apparatus 100 analyzes the standard image, sets an ROI, and calculates a feature value. Here, the image processing apparatus 100 sets an area within a predetermined radius or range as the ROI based on the set anchor point.

In addition, the processing device 101 may calculate the feature value of the standard image by using a first feature value calculation technique. Here, the feature for which the value is calculated may include a presence or an absence of a tumor, a location of the tumor, a distribution of intensity within the image, a tissue distribution, an abnormal tissue area, a texture, and a difference from a normal person's tissue distribution, etc.

The first feature value calculation technique may be a relatively complicated calculation as compared to a second feature value calculation technique. For example, the first feature value calculation technique may include image segmentation, in addition to data mining, rule mining, and a regression analysis, etc., which, as input, use a value extracted from the image through Fast Fourier Transform (FFT), Histogram of Oriented Gradient (HOG), a raw value, and deep learning, etc.

Although the anchor point has been described as being set according to a user's input in operation 510, once the standard image is analyzed, a center of the extracted lesion area may be set as the anchor point in 520.

In operation 530, the image processing apparatus 100 generates an analysis completion signal to inform the user when the analysis of the standard image has been completed. For example, the processing device 101 may generate an output, such as a voice (e.g., using the speaker), a vibration (of the apparatus or), or an image (e.g., a sign on the display).

In operation 540, the image processing apparatus 100 receives input of a real-time frame image and analyzes the input frame image in 540. For example, the processing device 101 may track the ROI set in the standard image or in a previous image frame by using an object tracking algorithm and set the ROI of the input frame image. In addition, the image processing apparatus 100 may calculate the feature value of the input frame image by using the first feature value calculation technique and the second feature value calculation technique. Here, the second feature value calculation technique may include a relatively simple calculation as compared to the first feature value calculation technique. For example, the second feature value calculation technique may include Fast Fourier Transform (FFT), Histogram of Oriented Gradient (HOG), a difference of intensity, and the like.

In an exemplary embodiment, the processing device 101 implements the first feature value calculation technique for the ROI of the input frame image and implements the second feature value calculation technique for the remainder of the input frame image to calculate the feature value of the frame image.

In operation 550, the processing device 101 compares the feature value of the input frame image with the feature value of the standard image and/or the feature value of a previous frame image to extract or determine an area corresponding to a change of the feature value and the degree of change of the feature value.

In operation 560, the processing device 101 processes the image to color-code an area corresponding to the changed feature value of the input frame image according to the degree of the changed feature value. For example, the processing device 101 may color-code the area by adjusting a color, a color saturation, or a transparency, of a corresponding area depending on the degree of the changed feature value of the area to visually distinguish each area of the changed feature value of the frame image. In another example, the processing device 101 may adjust a color, a color saturation, or a transparency, etc., depending on a frame distance between the input frame image and the previous frame that is the subject of comparison with the input frame image, and color-code the area of the changed feature value with the adjusted color, color saturation, or transparency.

In another exemplary embodiment, the processing device 101 may color-code only an area corresponding to a changed feature value that is greater than a pre-set threshold.

In operation 570, the image processing apparatus 100 displays the color-coded frame image. For example, the processing device 101 outputs processed imaged data for presentation to the user on the display. In one example, the image processing apparatus 100 may display the color-coded frame image along with the original frame image (e.g., as shown in FIG. 4A) or the color-coded frame image only (e.g., as shown in FIG. 4B).

In an additional exemplary embodiment, the image processing method may further include operation 555 of setting the area corresponding to a change in the feature value that is greater than a pre-set threshold as the ROI of the frame image.

In another additional exemplary embodiment, the image processing method may further include operation 575 of saving the color-coded frame image and the original frame image in a storage device when the degree of the change of the feature value is greater than a pre-set threshold.

The methods and/or operations described above may be recorded, stored, or fixed in one or more non-transitory computer-readable storage media that includes program instructions to be implemented by a processing device to execute or perform the program instructions. The media may also include, alone or in combination with the program instructions, data files, data structures, and the like. Examples of non-transitory computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. In addition, a non-transitory computer-readable storage medium may be distributed among computer systems connected through a network and the computer-readable codes or program instructions may be stored and executed in a decentralized manner.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:
1. An image processing apparatus, comprising:
a memory configured to store instructions; and
at least one processor, upon executing the stored instructions, configured to:
calculate a feature value of an input frame image by analyzing the input frame image,
compare the feature value of the input frame image with a feature value of a previous frame image,
identify, based on a result of the comparison, at least one area that the feature value is changed in the input frame image and calculate a degree of the change in the feature value of each area, and color-code the area based on the degree of the change in the feature value to generate a color-coded frame image, wherein the at least one processor is further configured to color-code the area by adjusting at least one of a color, a color saturation, or a transparency based on the degree of the change in the feature value to visually distinguish the color-coded area.

2. The image processing apparatus of claim 1, wherein the at least one processor is further configured to:

calculate a feature value of the previous frame image by analyzing the previous frame image.

3. The image processing apparatus of claim 1, wherein the previous frame image is a standard frame image.

4. The image processing apparatus of claim 1, wherein the feature comprises at least one of a presence of a tumor, an absence of a tumor, a location of the tumor, a distribution of intensity within the image, a tissue distribution, an abnormal tissue area, a texture, or a difference from a normal tissue distribution.

5. The image processing apparatus of claim 1, further comprising:

a display configured to display the color-coded frame image.

6. The image processing apparatus of claim 1, wherein the at least one processor is further configured to set a region of interest (ROI) of the input frame image by tracking the ROI of the previous frame image.

7. The image processing apparatus of claim 6, wherein the at least one processor is further configured to calculate the feature value of the input frame image by using:

a first feature value calculation technique on the set ROI of the input frame image, and a second feature value calculation technique on a remainder of the input frame image.

8. The image processing apparatus of claim 7, wherein the first feature value calculation technique comprises a relatively complex calculation as compared to the second feature value calculation technique, and wherein the second feature value calculation technique comprises a relatively simple calculation as compared to the first feature value calculation technique.

9. The image processing apparatus of claim 6, wherein the ROI of the input frame image is indicated by at least one of a specific mark, a specific line, or a specific color.

10. The image processing apparatus of claim 1, wherein the at least one processor is further configured to color-code an area that the degree of the change in the feature value is greater than a preset threshold.

11. The image processing apparatus of claim 1, wherein the at least one processor is further configured to color-code the area by adjusting at least one of a color, a color saturation, or a transparency based on a distance between the input frame image and the previous frame image to visually distinguish the color-coded area.

12. The image processing apparatus of claim 1, wherein the at least one processor is further configured to store the color-coded frame image when the degree of the change is greater than a preset threshold.

13. The image processing apparatus of claim 1, wherein the at least one processor is further configured to set an area of the input frame image where the degree of the change is greater than a preset threshold as a region of interest (ROI).

14. An image processing method comprising:

calculating, by at least one processor, a feature value of an input frame image by analyzing the input frame image;

comparing, by the at least one processor, the feature value of the input frame image with a feature value of a previous frame image;

identifying, based on a result of the comparison, at least one area that the feature value is changed in the input frame image and calculating a degree of the change in the feature value of each area;

color-coding, by the at least one processor, the determined area based on the degree of the change in the feature value; and generating, by the at least one processor, a color-coded frame image, based on the color-coding, for display, wherein the color-coding comprises color-coding the area by adjusting at least one of a color, a color saturation, or a transparency based on the degree of the change in the feature value to visually distinguish the color-coded area.

15. The image processing method of claim 14, further comprising:

calculating a feature value of the previous frame image by analyzing the previous frame image.

16. The image processing method of claim 14, wherein the previous frame image comprises a standard frame image.

17. The image processing method of claim 16, wherein the color-coding of the area comprises color-coding an area that the degree of the change in the feature value is greater than a preset threshold.

18. The image processing method of claim 14, wherein the feature comprises at least one of a presence of a tumor, an absence of a tumor, a location of the tumor, a distribution of intensity within the image, a tissue distribution, an abnormal tissue area, a texture, or a difference from a normal tissue distribution.

19. The image processing method of claim 14, further comprising:

prior to the calculating the feature value of the frame image, setting a region of interest (ROI) of the frame image by tracking the ROI of the previous frame image.

20. The image processing method of claim 19, wherein the calculating of the feature value of the input frame image comprises calculating the feature value of the input frame image by using:

a first feature value calculation technique on the set ROI of the input frame image, and a second feature value calculation technique on a remainder of the input frame image.

21. The image processing method of claim 20, wherein the first feature value calculation technique comprises a relatively complex calculation as compared to the second feature value calculation technique, and wherein the second feature value calculation technique comprises a relatively simple calculation as compared to the first feature value calculation technique.

22. The image processing method of claim 19, wherein the generating of the color-coded frame image comprises generating an indication of the ROI of the frame image using at least one of a specific mark, a specific line, or a specific color.

23. The image processing method of claim 14, wherein the color-coding of the area comprises color-coding the area by adjusting at least one of a color, a color saturation, or a transparency based on a distance between the input frame image and the previous frame image to visually distinguish the color-coded area.

24. The image processing method of claim 14, further comprising:
   storing the color-coded frame image when the degree of the change is greater than a preset threshold.

25. The image processing method of claim 14, further comprising:
   setting an area of the input frame image where the degree of the change is greater than a preset threshold as a region of interest (ROI).

* * * * *